United States Patent [19]
Haumesser

[11] Patent Number: 5,928,520
[45] Date of Patent: Jul. 27, 1999

[54] METHOD AND APPARATUS FOR EXTRACTING GROUND WATER CONTAIMINANTS

[75] Inventor: Earl J. Haumesser, Seville, Ohio

[73] Assignee: Abanaki Corporation, Auburn, Ohio

[21] Appl. No.: 08/895,435

[22] Filed: Jul. 16, 1997

[51] Int. Cl.[6] .................................................. C02F 1/40
[52] U.S. Cl. .................... 210/747; 210/776; 210/170; 210/242.3; 210/540; 166/69; 166/265
[58] Field of Search .................. 210/747, 776, 210/170, 242.3, 526, 540; 166/69, 75.12, 265

[56] References Cited

U.S. PATENT DOCUMENTS

| | | |
|---|---|---|
| 2,953,204 | 9/1960 | Doscher et al. . |
| 4,435,292 | 3/1984 | Kirk et al. . |
| 4,663,037 | 5/1987 | Breslin .................................. 210/170 |
| 4,746,423 | 5/1988 | Moyer .................................... 166/215 |
| 5,080,781 | 1/1992 | Evins, IV ............................... 210/170 |
| 5,172,764 | 12/1992 | Hajali et al. . |
| 5,173,092 | 12/1992 | Rudder . |
| 5,220,958 | 6/1993 | Bernhardt ............................... 210/770 |
| 5,252,000 | 10/1993 | Mohs . |
| 5,326,458 | 7/1994 | Johnson ................................. 210/170 |
| 5,345,655 | 9/1994 | Bernhardt . |
| 5,346,330 | 9/1994 | Bernhardt ............................... 210/747 |
| 5,378,371 | 1/1995 | Hobson . |
| 5,514,266 | 5/1996 | O'Brien et al. . |
| 5,527,457 | 6/1996 | Holland . |
| 5,575,585 | 11/1996 | Kovarik . |

*Primary Examiner*—Christopher Upton
*Attorney, Agent, or Firm*—Watts, Hoffmann, Fisher & Heinke Co., L.P.A.

[57] ABSTRACT

An oil skimmer and method of operation for removing hydrocarbon contaminates from ground water are disclosed. A drive pulley and upper portions of a pickup belt of a belt type oil skimmer are encased within a hermetically sealed housing. A seal collar forms an hermetic seal between the housing and a well casing. A vacuum source draws air from within a collection tank and from within the skimmer housing. The withdrawal of air from the skimmer housing functions to draw further air from within the well casing and from within the well itself Optionally, air under pressure is injected into ground strata at locations near, but spaced from the contaminate pickup area.

21 Claims, 2 Drawing Sheets

METHOD AND APPARATUS FOR EXTRACTING GROUND WATER CONTAIMINANTS

This invention relates to the removal of hydrocarbon contamination from ground water and more particularly to a system and method for extracting hydrocarbon contamination from ground water through a well shaft.

BACKGROUND OF THE INVENTION

Oil skimmers which utilize endless belts that are suspended into bodies of water having hydrocarbon contaminates on the surface are now well known. In operation as a belt is rotatively driven contaminates adhere to a descending reach of a belt as it enters a body of water. The adhered hydrocarbon contaminates are carried upwardly by an ascending reach of the belt to a wiping station, where they are removed from the belt and delivered to a collection station for suitable disposal.

In an effort to control ground water contamination resulting from, for example, spilled oil at a service station, it is not uncommon to drill a small monitoring well near the station. This small well is used to monitor the ground water in order to detect water contamination from service station spills in an early stage of contamination.

Once contamination is detected, one solution is to suspend an oil skimmer belt through a shaft of the monitoring well into the ground water below it. Operation of the skimmer relatively quickly removes contamination in the immediate vicinity of the well shaft. Following such removal relatively long periods of time elapse before contamination from surrounding earth strata flows into the vicinity of the pickup location enabling further contamination removal.

There have been many proposals for removing contamination from ground water, some of which seek to enhance the flow of contaminates into a pickup region. All such proposals have been relatively complex and expensive and as such are especially unsuitable for small pockets of contamination, such as in the vicinity of an automobile service station. Accordingly, there is a need for a simple enhanced system for removal of contaminates and relatively small pockets of contamination.

SUMMARY OF THE INVENTION

In a system made in accordance with this invention a belt type oil skimmer is employed. A sectioned housing surrounds a drive pulley, portions of the drive and upper portions of the pickup belt. A seal coupling is provided to form an air tight seal between the housing and a shaft of a monitoring well. A novel and unique guide member is supported by a tail shaft pulley while the pulley in turn is supported by the belt. The guide member functions to guide the tail pulley and belt through a well casing until lower portions of the belt and portions of the tail pulley are immersed in a contaminated body of ground water for pickup of hydrocarbon contaminates.

A vacuum source is coupled to the sectioned housing or the coupling for reducing air pressure within the housing, a well shaft and the well volume adjacent the pickup station. The evacuation of air from this region encourages the flow of contaminates from strata surrounding the pickup region into the pickup region.

Flow of contaminates into the pickup region optionally may be further enhanced by introduced air under pressure at locations near but spaced from the pickup station to tend push contaminants from the surrounding strata into the region around the pickup station.

Accordingly, the objects of this invention are to provide a novel and improved system for extraction of ground water contamination and a process of extraction such contamination.

DESCRIPTION OF THE PREFERRRED EMBODIMENT

Figure 1:
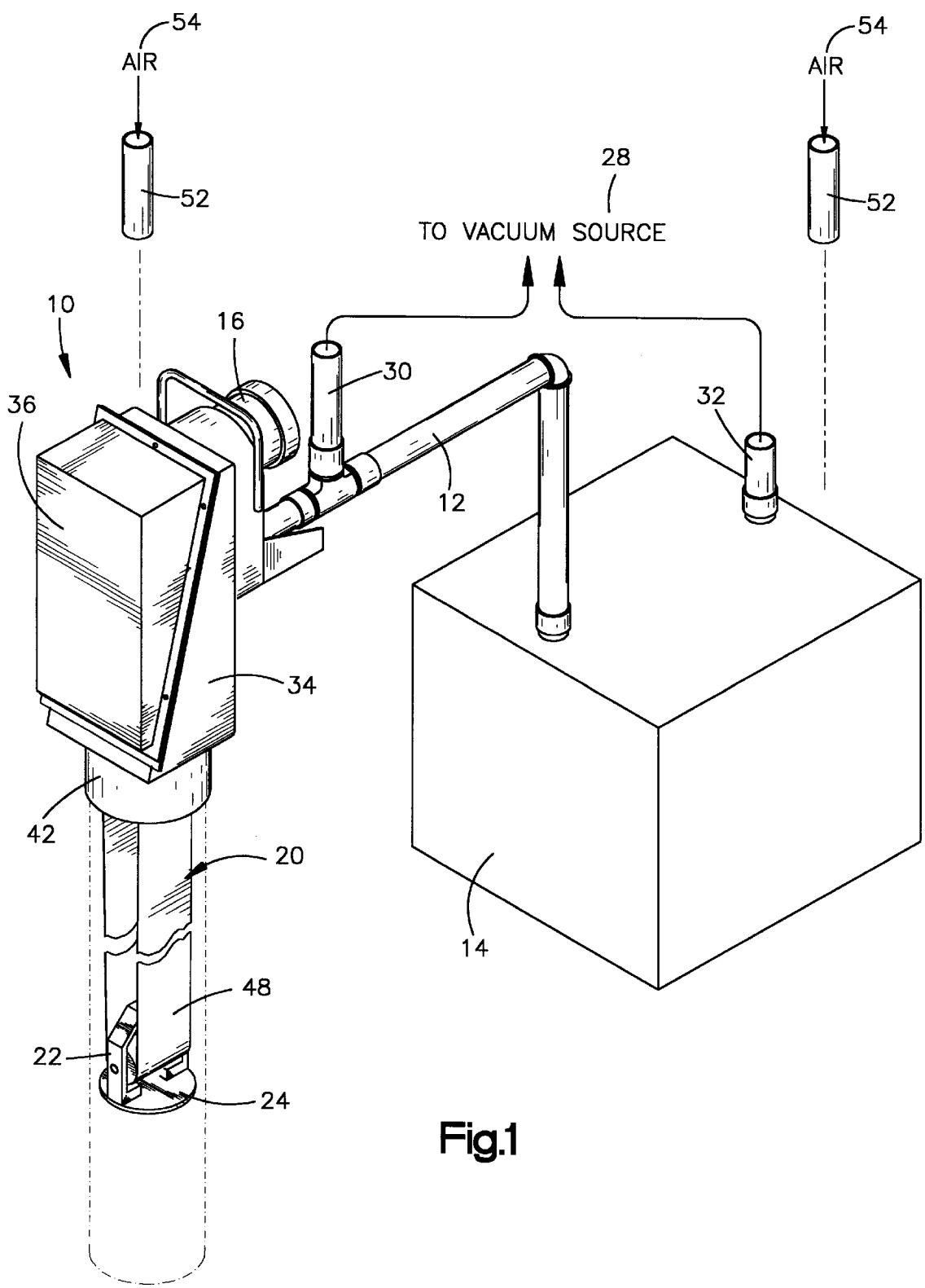
FIG. 1 is a perspective partially schematic view of the oil skimmer of this invention and a contaminate collection tank; and, FIG. 2 is an exploded view of the skimmer of FIG. 1 on an enlarged scale with respect to FIG. 1.

Referring now to the drawings, an oil skimmer is shown generally at 10. As shown in FIG. 1, a contaminant delivery pipe 12 is connected to the skimmer 10. The pipe 12 serves to guide collected hydrocarbon contaminants as they gravity flow from the skimmer 10 into a collection tank 14.

The skimmer 10 is a skimmer of the belt type which is now well known. An example of a belt type skimmer is disclosed and claimed in U.S. Pat. No. 5,378,371 issued Jan. 3, 1995 and entitled Method for Removing Oil From Water and Apparatus Therefor.

Figure 2:
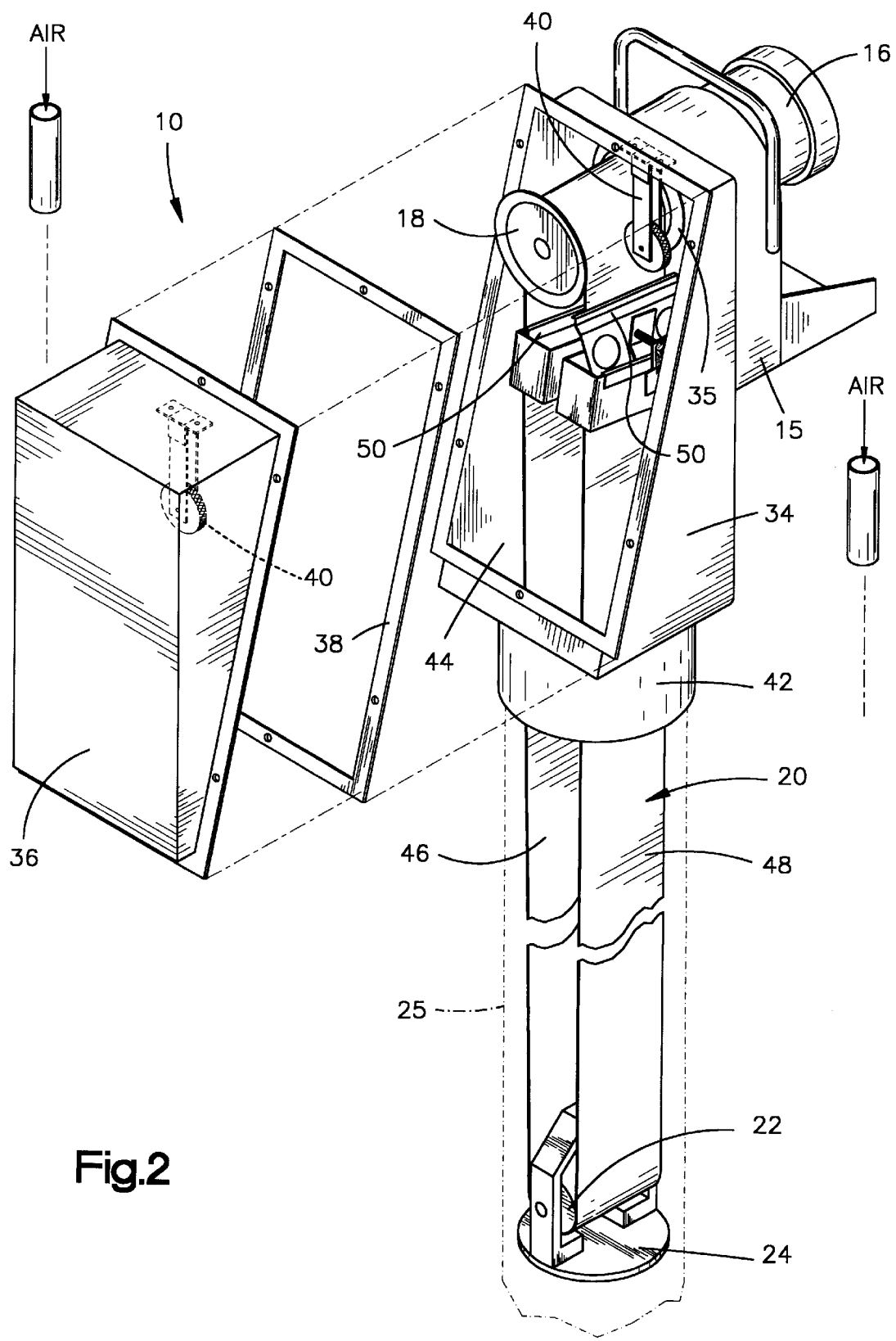

The present skimmer includes a frame structure 15, FIG. 2. The frame structure supports a drive motor 16. A belt drive pulley 18 is connected to an output shaft of the motor 16. The drive pulley 18 functions to support and drive an endless pickup belt 20.

The belt 20 supports a tail pulley 22 which, when the skimmer is in use, is at least partially immersed in a body of water from which oil contaminates are being removed.

The skimmer of this invention is designed for removal of hydrocarbon contaminates from ground water. To this end a belt guide 24 depends from the tail pulley 22. The belt guide 24 is sized to slidingly engage interior surfaces of a well shaft shown schematically at 25 in FIG. 2.

When a belt type pulley is used to extract hydrocarbon contamination from ground water, under normal circumstances it rather quickly removes oil in the vicinity of the pickup belt. Once the contaminates from the vicinity of the belt have been collected, further contamination flows into a collection area only very slowly, so that a contamination removal from the ground water is a long and tedious process.

In order to enhance the recovery rate of ground water contamination, the present invention provides for the evacuation of air from a space near and around the pickup area thereby producing a pressure differential which enhances the flow of contaminates into the pickup area. To this end a vacuum source indicated only by a legend at 28 is connected through a vacuum pipe 30 to the delivery pipe 12 and through a further vacuum pipe 32 to the collection tank 14.

A housing body 34 is connected to the frame 15 in fluid tight relationship. A motor seal flange 35 is around the motor 16 and connected to the housing body 34, FIG. 2. The motor seal flange forms an air tight seal between the motor and the housing body.

A housing cover 36 is connected to the body when the unit is in use. A gasket 38 is interposed between the housing body and the cover 34,36 to assure an air tight seal between them.

Pressure wheel assemblies 40 are carried by the housing body and cover, FIG. 2. The pressure wheel assemblies act against the belt 20 to bias it into frictional engagement with the drive pulley 18.

A seal collar 42 is connected to a bottom wall 44 of the housing body 34 in an air tight relationship. The seal body is tubular with the belt 20 projecting through it. A seal body 42 is a seal coupling forming an air tight connection with the well shaft 25 as well as the bottom wall 44.

OPERATION

In operation, the belt guide 24 is lowered into a well shaft or casing 25. The lowering continues until the tail pulley 22 and the lower portions of the belt 20 are at least partially immersed in a body of ground water. The seal collar is sealingly connected to the shaft 25 to form an air tight seal. The housing cover 36 is securely connected to the housing body, such that the volume within the housing and the shaft is isolated from the surrounding ambient atmosphere.

The motor 16 is energized to drive the belt 20, such that its descending reach 46 on entering the water will pickup surface hydrocarbon contamination, carry it around the tail pulley and upwardly on an ascending reach 48. Wipers 50 mounted within the housing and immediately below the drive pulley 18 function in the usual manner to wipe collected contaminates from the ascending reach 48. The wiped hydrocarbons then flow through the delivery pipe 12 into the collection tank 14.

As the skimmer 10 is being operated, the vacuum source 28 is energized to extract atmospheric gases through the vacuum pipes 30,32 and thence from within the housing 34,36, the seal collar 42, the well casing 25 and the well itself. This vacuum extraction of gases from within the well enhances contamination flow into an area around the belt 20.

To further enhance the flow of hydrocarbon contaminates from the strata surrounding the well pickup area, air injector tubes 52 may be provided. The injector tubes are inserted into the ground at locations relatively near, but spaced from, the contaminate pickup area. Air under pressure from sources indicated by legends 54 is directed through the tubes 52 to push oil from ground strata around the pickup area.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. A system for removing hydrocarbon contaminants from ground water in a well by extracting the contaminants through a tubular well shaft, the system comprising:
   a) an airtight housing having an inlet opening, the housing being adapted to mount atop such shaft;
   b) an oil skimmer having a depending endless pickup member for depending into the shaft and a member drive;
   c) at least portions of the drive and the member being within the housing when the system is in use;
   d) the member having another portion extending through the opening when the system is in use;
   e) a shaft seal for effecting an airtight seal between the housing and such well shaft when the system is in use; and,
   f) a vacuum source for operable connection to a space within the housing to effect a pressure reduction in the housing and in a connected well while the housing and seal substantially prevent fluid entry into the well other than from the ambient ground when the system is in use whereby to enhance the flow of contaminants into the well and thereby enhance the contaminant extraction performance of the system when in use.

2. The system of claim 1, wherein the drive includes an electric motor disposed at least in part in a space external of the housing.

3. The system of claim 1, wherein the housing includes separable sections and an hermetic seal between the section.

4. The system of claim 1, further including at least one air injector for injecting air under pressure into the ground at a location near, but spaced from, such well when the system is in use.

5. The system of claim 1, further including a tail pulley and a depending well guide connected to the tail pulley.

6. The system of claim 1, wherein the endless member is a belt.

7. A process of extracting hydrocarbon contaminants from ground water comprising:
   a) mounting an oil skimmer of the endless pickup type atop a well casing;
   b) extending an endless hydrocarbon pickup member into a well and the ground water;
   c) effecting a seal between the casing and a housing defining a space around at least a portion of the pickup member external of the well and thereby preventing the ingress of fluids into the ground water via the space and the casing;
   d) applying a vacuum source to the space and well to produce reduced atmospheric pressure in the well relative to an ambient atmosphere around the pickup member, and,
   e) operating the pickup member to extract hydrocarbon contaminants from the ground water at a pickup station.

8. The process of claim 7 wherein the pickup member is an endless belt of a belt type oil skimmer.

9. The process of claim 7, further including the step of injecting air under pressure into the ground at least one location near but spaced from the well whereby to encourage the flow of contaminants toward the pickup station.

10. The process of claim 9, wherein air is injected at a plurality of locations.

11. The process of claim 7, wherein the contaminants are separated from the ground water and substantially all of the ground water remains in the well as the contaminants are extracted.

12. A process of extracting hydrocarbons from contaminated ground water comprising:
   a) immersing a lower portion of an endless oil removal member in the ground by passing the member through a well shaft and lowering the member until the member depends into the water;
   b) establishing an evacuatable space by surrounding an upper portion of the member and at least member engaging portions of a member drive with an airtight housing;
   c) mounting the housing on the shaft and forming an airtight seal between the housing and the shaft to maintain fluid communication between the well and the space while separating both the space and the well from the ambient atmosphere;
   d) evacuating gases from the well and the space to accelerate the flow of contaminants into the well; and,
   e) driving the member to extract contaminants from the well.

13. The process of claim 12, further including the step of injecting air under pressure into the ground at least one location near but spaced from the well whereby to encourage the flow of contaminants toward the pickup station.

14. The process of claim 13, wherein air is injected at a plurality of locations.

15. The process of claim 12, wherein the endless member is a belt.

16. The process of claim 12, wherein the contaminants are separated from the ground water and substantially all of the ground water remains in the well as the contaminants are extracted.

17. An oil skimmer for removal of hydrocarbon contaminants from a well having a tubular casing comprising:
   a) a frame for mounting on such casing;
   b) a drive carried by the frame and including a drive pulley mounted on a drive output shaft;
   c) an endless member drivingly connectable to the pulley for depending through such casing into a body of ground water;
   d) a multiple sectioned air tight housing around an upper portion of the member and at least a portion of the drive when the skimmer is in use whereby the member may operate in a reduced air pressure environment; and,
   e) a seal collar for forming an hermetic seal between the housing and such casing whereby on connection of a vacuum source air may be with drawn from a space within the housing and such well.

18. The skimmer of claim 17, wherein the endless member is a belt.

19. The system of claim 17, further including a tail pulley and a depending well guide connected to the tail pulley.

20. The system of claim 17, wherein the drive includes an electric motor disposed at least in part in a space external of the housing.

21. The system of claim 17, further including at least one air injector for injecting air under pressure into the ground at a location near, but spaced from, such well when the system is in use.

\* \* \* \* \*